US008063987B2

(12) United States Patent
Cheng et al.

(10) Patent No.: US 8,063,987 B2
(45) Date of Patent: Nov. 22, 2011

(54) DIGITAL PHOTO FRAME WITH TELEVISION TUNING FUNCTION AND METHOD THEREOF

(75) Inventors: Chia-Yu Cheng, Taipei Hsien (TW); Li-Hua Hu, Shenzhen (CN); Kuan-Hong Hsieh, Taipei Hsien (TW); Zai-An Pan, Shenzhen (CN); Han-Che Wang, Taipei Hsien (TW); Shin-Hong Chung, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 483 days.

(21) Appl. No.: 12/408,730

(22) Filed: Mar. 23, 2009

(65) Prior Publication Data
US 2010/0039559 A1   Feb. 18, 2010

(30) Foreign Application Priority Data
Aug. 13, 2008   (CN) ........................ 2008 1 0303734

(51) Int. Cl.
*H04N 5/50* (2006.01)
(52) U.S. Cl. ...................................... 348/553
(58) Field of Classification Search .......... 348/553–554, 348/731, 725, 732; 725/133, 141, 153, 134, 725/142
See application file for complete search history.

(56) References Cited

U.S. PATENT DOCUMENTS

| 6,961,904 | B2 * | 11/2005 | Pilu ............................. 715/718 |
| 7,103,905 | B2 * | 9/2006 | Novak ............................. 725/46 |
| 7,274,482 | B2 * | 9/2007 | Yeh et al. ...................... 358/1.15 |
| 7,352,407 | B2 * | 4/2008 | Lan et al. ...................... 348/569 |
| 2009/0077612 | A1 * | 3/2009 | Shen et al. ................... 725/134 |
| 2009/0262135 | A1 * | 10/2009 | Huston et al. ................ 345/629 |

* cited by examiner

*Primary Examiner* — Paulos Natnael
(74) *Attorney, Agent, or Firm* — Altis Law Group, Inc.

(57) ABSTRACT

A method used in a digital photo frame (DPF) with television (TV) tuning function is provided. The method includes: receiving search parameters input by users during a DPF mode of the DPF; searching in a pre-stored TV program schedule to find TV programs matched the search parameters; determining whether any of the TV programs matched the search parameters is on or about to start at the current time; displaying a program list showing information at least on the "currently on" or "about to start" TV programs among the matched TV programs; switching the DPF from the DPF mode to a TV mode if a "currently on" or "about to start" TV program is selected to play; and receiving and playing the selected TV program. A related DPF is provided.

20 Claims, 5 Drawing Sheets

DIGITAL PHOTO FRAME WITH TELEVISION TUNING FUNCTION AND METHOD THEREOF

TECHNICAL FIELD

The disclosure relates to a digital photo frame (DPF) with a television (TV) tuning function and method thereof.

DESCRIPTION OF RELATED ART

Along with rapid development in electronic technology, DPFs have become familiar to consumers. Some types of DPFs have been designed not only to display photos, but also to receive TV programs.

A DPF is usually in a DPF mode that plays photos or the like. However, nowadays DPFs may not provide a function for providing people with broadcast times of their favorite programs. Even if people get their favorite TV program schedule information from entertainment sections in newspaper or from electronic program guides (EPGs), people may forget the broadcast times of their TV programs for one reason or another. As a result, it is usually troubled for people to switch the DPF from the DPF mode to a TV mode of the DPF to watch their favorite programs at the right time.

BRIEF DESCRIPTION OF THE DRAWINGS

The components of the drawings are not necessarily drawn to scale, the emphasis instead being placed upon clearly illustrating the principles of a digital photo frame (DPF) with television (TV) tuning function and method thereof. Moreover, in the drawings, like reference numerals designate corresponding parts throughout several views.

DETAILED DESCRIPTION OF THE EMBODIMENTS

Figure 1:
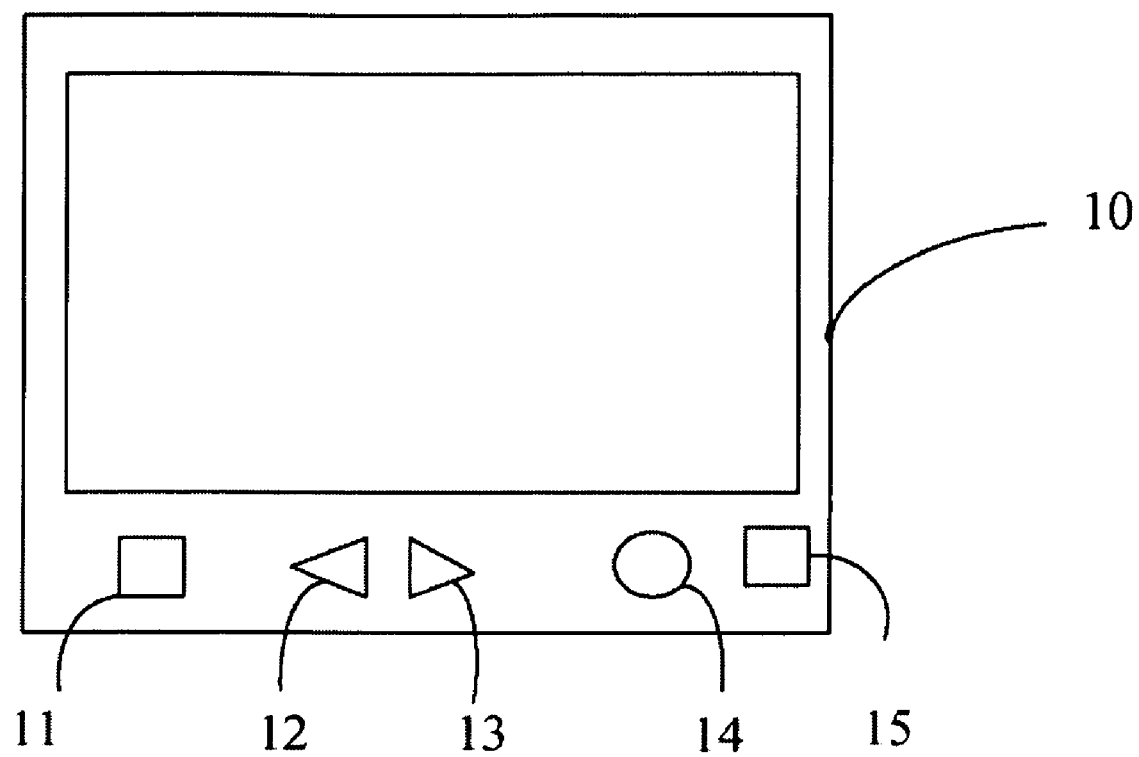
FIG. 1 is a front view of a DPF with TV tuning function in accordance with an exemplary embodiment.

FIG. 1 is a front view of a digital photo frame (DPF) 10 with television (TV) tuning function in accordance with an exemplary embodiment.

The DPF 10 mainly includes a power button 11, a previous button 12, a next button 13, a switch button 14 and a preview button 15. The power button 11 is configured for powering on and powering off the DPF 10. The switch button 14 is configured for manually switching between operation modes of the DPF 10, for example, between a DPF mode and a TV mode. When the DPF 10 is in the DPF mode, the previous button 12 and the next button 13 are configured for paging through multimedia files such as photos stored in the DPF 10. When the DPF 10 is in the TV mode, the previous button 12 and the next button 13 are configured for changing TV channels. The preview button 15 is configured for previewing TV programs. When the DPF 10 is in the TV mode, the preview button 15 is configured for previewing TV programs. When the DPF 10 searches TV programs in the DPF mode, the preview button 15 is configured for previewing the selected TV programs from search results.

Figure 2:
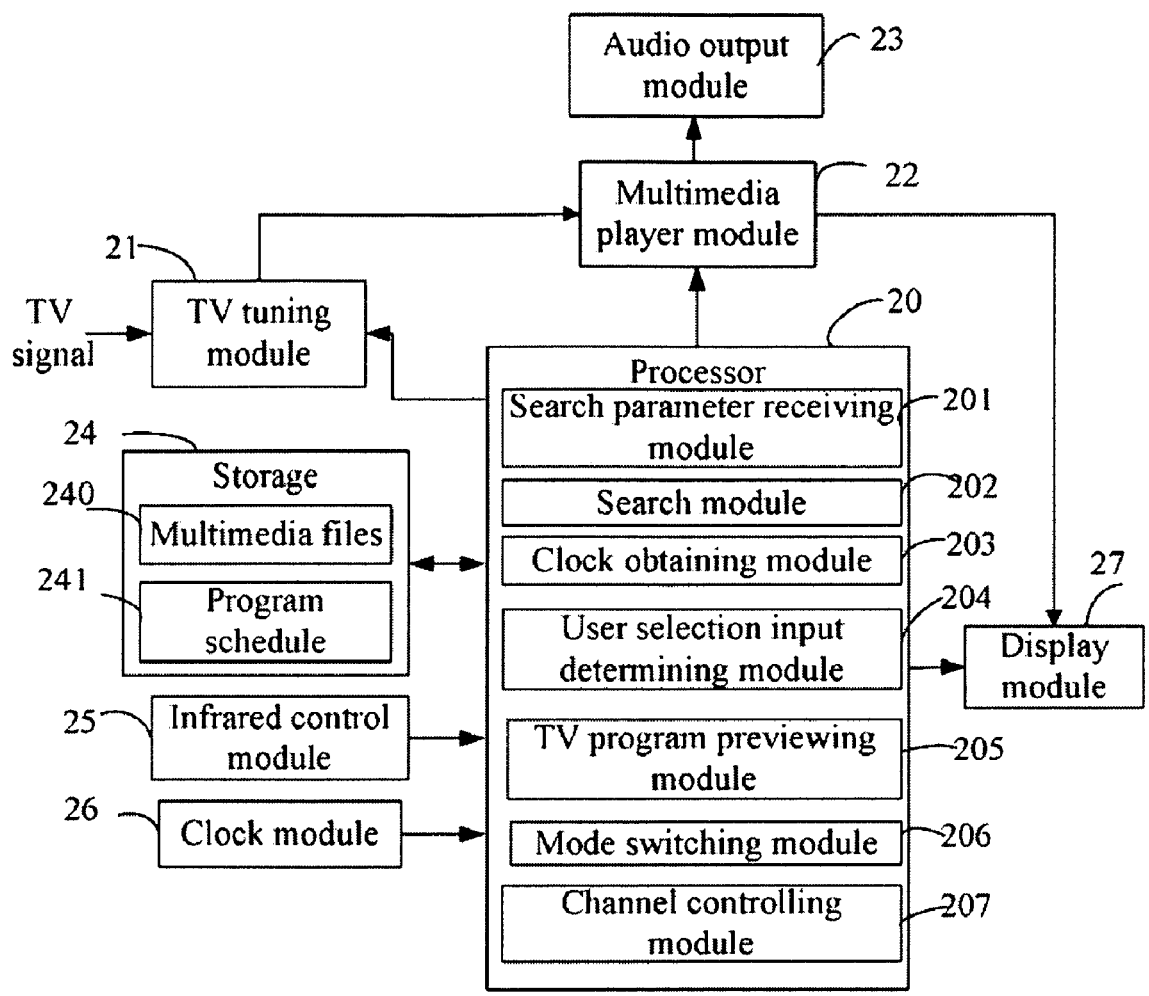
FIG. 2 is a block diagram of the DPF of FIG. 1 in accordance with an exemplary embodiment.

FIG. 2 is a block diagram of the DPF 10 in accordance with an exemplary embodiment.

The DPF 10 includes a processor 20 connected to a TV tuning module 21, a multimedia player module 22, a storage 24 and a display module 27, which are controlled by the processor 20.

The storage 24 is configured for storing multimedia files 240. The multimedia files 240 may include photos, audio files, video files, and so on. When the DPF 10 is in the DPF mode, the processor 20 obtains the multimedia files 240 from the storage 24 and transfers the multimedia files 240 to the multimedia player module 22. The multimedia player module 22 then reproduces image/audio data of the multimedia files 240 on the display module 27. When the DPF 10 is in the TV mode or when a TV program preview function is activated in the DPF mode, the TV tuning module 21 is controlled by the processor 20 to receive TV signals and transfers the TV signals to the multimedia player module 22. The TV tuning module 21 may receive TV signals by any usual means such as via an antenna (not shown) or a cable (not shown). The multimedia player module 22 then reproduces image/audio data of the TV signals on the display module 27. The multimedia player module 22 is connected to an audio output module 23 (e.g., a speaker) and the display module 27. The audio output module 23 is configured to output the audio data of the multimedia files 240 and the TV signals.

The storage 24 is further configured for storing at least a TV program schedule 241. The TV program schedule 241 can be input manually or can be an electronic program guide (EPG) obtained, for example, from the Internet and loaded into the DPF 10. The TV program schedule 241 shows information on one or more TV programs. The information of each TV program can include the program title, a broadcast time, and the TV station broadcasting the TV program. The broadcast time in one exemplary embodiment includes a start time and an end time of each of the TV programs. The broadcast time in another exemplary embodiment includes the start time and a program time length of each of the TV programs.

The DPF 10 also includes an infrared control module 25. The infrared control module 25 is configured for receiving infrared control signals from a remote control (not shown) and converting the infrared control signals to digital serial signals. The digital serial signals are sent to the processor 20 and the processor 20 adjusts various parameters of the controllable modules according to the digital serial signals. The previous button 12 and the next button 13 can also be integrated onto a remote control to control the play of the multimedia files 240 and TV programs.

Figure 4:
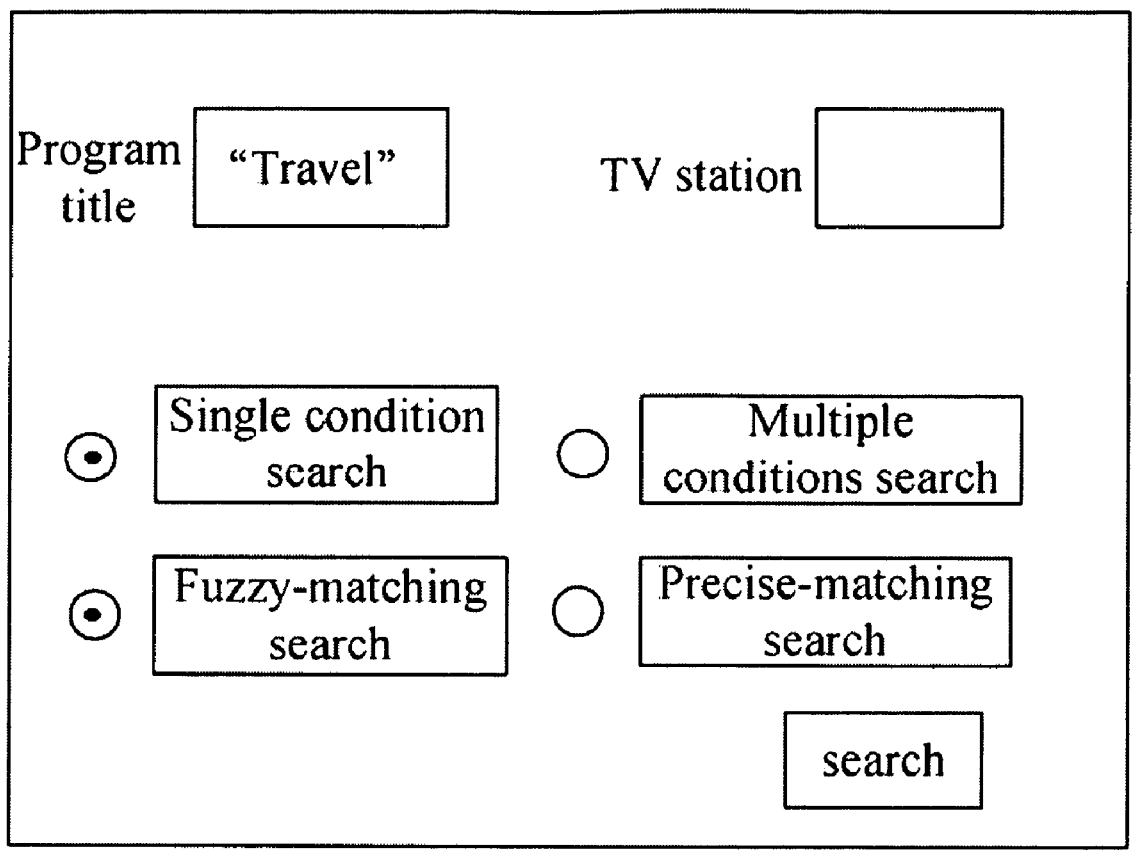
FIG. 4 is a schematic view of a user interface for inputting search parameters to the DPF of FIG. 1 in accordance with an exemplary embodiment.

The DPF 10 also provides a user interface (UI) on the display module 27 (see FIG. 4). The UI is configured for providing a plurality of windows for users to input search parameters. In this exemplary embodiment, the UI includes a program title input window and a TV station input window. The UI also provides at least two kinds of search modes. The first kind of search mode includes a single parameter search and a multiple parameters search, and the second kind of search mode includes a precise-matching search and a fuzzy-matching search.

The DPF 10 can search through the TV program schedule 241 according to the search parameters input by users. For example, if "The Travel Show" is input in the program title input window, and "CCTV-1" is input in the TV station input window, and the multiple parameters search and the precise-matching search are selected, the TV program "The Travel Show" may be searched for by the DPF 10 according to the search parameters. For another example, if "Travel" is input in the program title input window, and the single parameter search and the fuzzy-matching search are selected, then any TV program listed in the program schedule 241 that includes the word "Travel" in its title will be returned in the search results according to the search parameters. In an embodiment, the previous button 12, the next button 13 and other buttons are also configured for the users to input search parameters in a search mode. In an alternative embodiment, a remote controller is provided for the users to input search parameters.

The DPF 10 further includes a clock module 26 configured for providing current time information.

The processor 20 includes a search parameter receiving module 201, a search module 202, a clock obtaining module 203, a user selection input determining module 204, a TV program previewing module 205, a mode switching module 206 and a channel controlling module 207.

The search parameter receiving module 201 is configured for receiving the search parameters input by the users, e.g., the keywords and selections of the search modes input by the users under the DPF mode, and processing the search parameters such that they are recognizable by the search module 202.

The search module 202 is configured for searching TV programs that match the recognizable search parameters, and further determining whether any matched TV program is on or about to start at the current time. In the exemplary embodiment, the current time is recorded by the clock module 26 and obtained by the clock obtaining module 203. If the search module 202 determines that a TV program will be starting within a preset time interval, or, if the TV program has already started, then the TV program is defined as "about to start" or "currently on" respectively.

The search module 202 is also configured for generating and displaying a program list on the display module 27. The program list can show information on all the matched TV programs or only the "currently on" or "about to start" TV programs among the matched TV programs. The information may include program titles, start times and the TV stations of the TV programs. The information can also include end times or program time lengths of the TV programs. If the program list shows information on a plurality of TV programs, the search module 202 can list the TV programs on the program list in a predetermined order. In the exemplary embodiment, the search module 202 lists the TV programs according to the start times of the TV programs. In an alternative embodiment, the search module 202 lists the TV programs according to users' preferences. In another alternative embodiment, the search module 202 further distinguishes the "currently on" TV programs from the "about to start" TV programs, and lists the "currently on" TV programs before the "about to start" TV programs. The TV programs on the program list can be selected by the users through operating the previous button 12 and the next button 13 or operating the buttons integrated onto the remote control.

The user selection input determining module 204 is configured for determining whether a user selection input is received within a preset time interval when the program list is displayed, and further determining whether the user selection input is a preview selection input or a mode switching selection input. The user selection input is generated through operating the switch button 14 or the preview button 15. If a "currently on" TV program on the program list is selected and the preview button 15 is operated, the user selection input determining module 204 determines a preview selection input is received. Accordingly, the user selection input determining module 204 generates a preview signal and transmits the preview signal to the TV program previewing module 205. If a "currently on" or "about to start" TV program on the program list is selected and the switch button 14 is operated, the user selection input determining module 204 determines a mode switching selection input is received. Accordingly, the user selection input module 205 generates a mode switching signal and transmits the mode switching signal to the mode switching module 206. If no user selection input is received within the preset time interval, the user selection input determining module 204 informs the search module 202 to stop the display of the program list.

The TV program previewing module 205 is configured for controlling the preview of a selected "currently on" TV program if a preview signal is received from the user selection input determining module 204, including providing the TV station information of the selected TV program to the channel controlling module 207, controlling the preview time and the preview location of the selected TV program on the display module 27. The TV preview time in an exemplary embodiment is preset and stored in the storage 24 by the users. In an embodiment, the selected TV program occupies the full screen of the display module 27. In another alternative embodiment, the selected TV program and the program list are displayed on the display module 27 in a picture-on-picture display mode.

The mode switching module 206 is configured for switching the DPF 10 from the DPF mode to the TV mode and providing the TV station of a selected "currently on" or "about to start" TV program to the channel controlling module 207 if a mode switching signal is received from the user selection input determining module 204.

The channel controlling module 207 is configured for controlling the TV tuning module 21 to tune in to the TV station of a selected TV program.

Figure 3A:
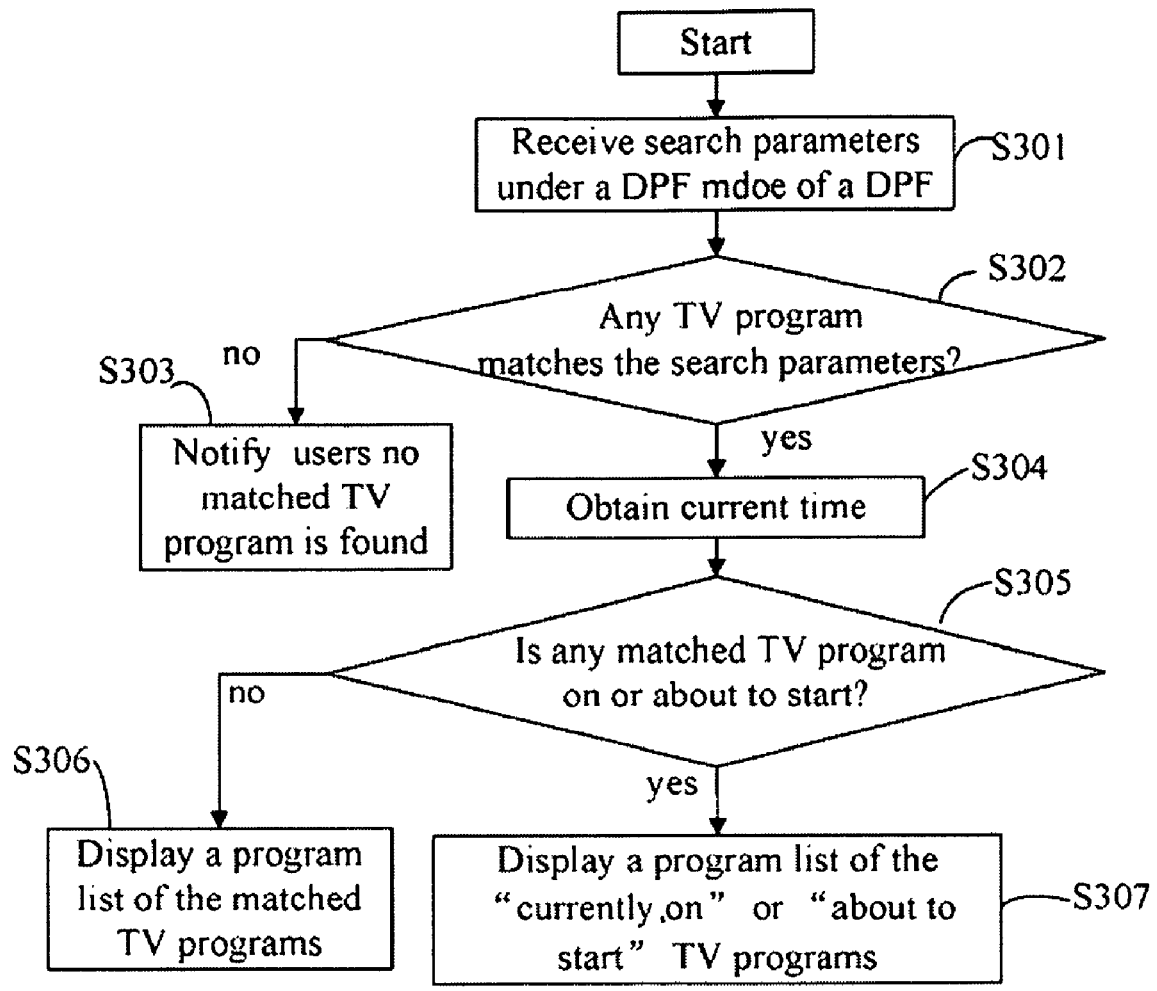
FIG. 3A-FIG. 3B is a flowchart of illustrating a TV tuning function of the DPF of FIG. 1 in accordance with an exemplary embodiment.
Figure 3B:
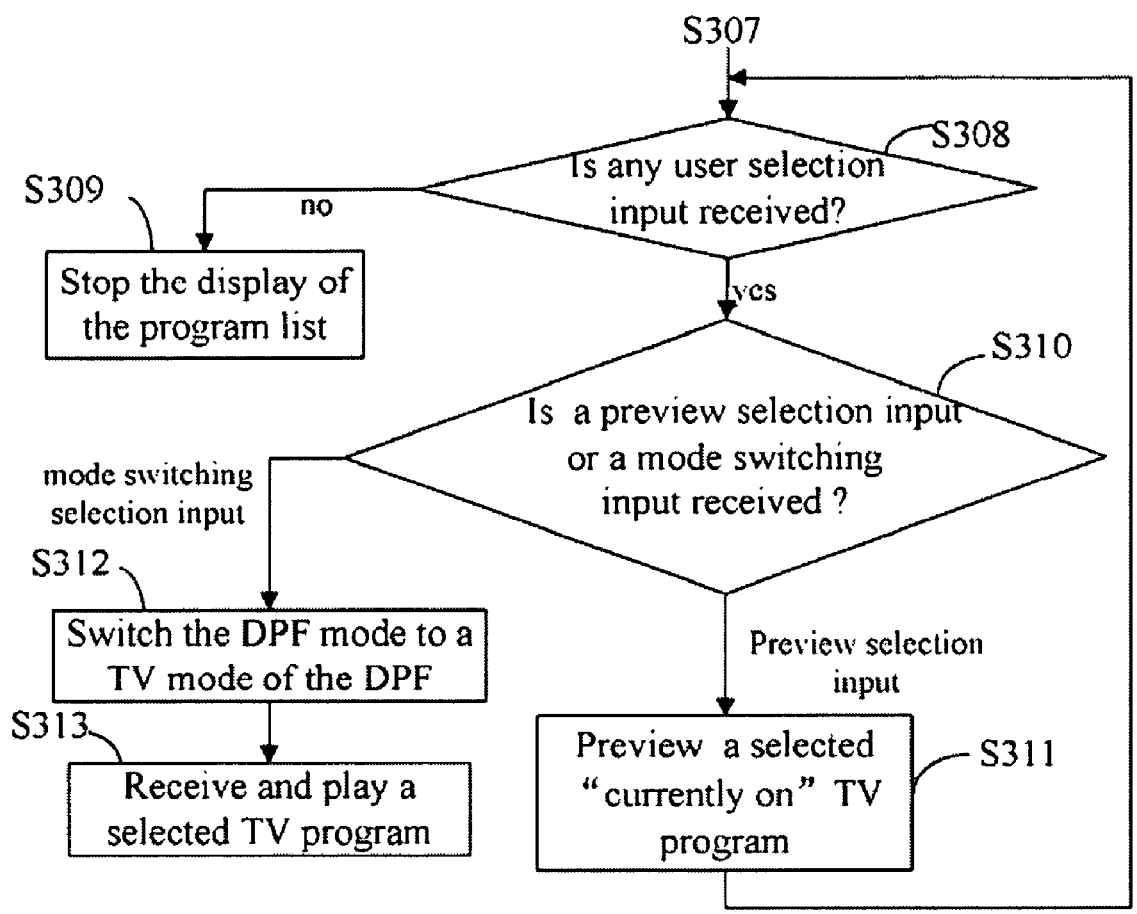

FIG. 3A-FIG. 3B is a flowchart of illustrating a TV tuning function of the DPF 10 in accordance with an exemplary embodiment.

In step S301, under the DPF mode, the TV program searching function is activated through a button (not shown). The UI is displayed on the display module 27 by the processor 20, allowing users to input search parameters, such as keywords and selections of search modes. The search parameter receiving module 201 receives the search parameters, processes the search parameters such that they are recognizable by the search module 202, and transmits the recognizable search parameters to the search module 202.

In step S302, the search module 202 determines whether any TV program listed on the TV program schedule 241 matches the recognizable search parameters. If one or more TV programs match the recognizable search parameters, the procedure proceeds to step S304, otherwise the procedure proceeds to step S303.

In step S303, the search module 202 generates a notification signal and transmits the notification signal to the multimedia player module 22. The notification signal is output by the multimedia player module 22 within a preset time interval, as a message notifying users no TV program matching the search parameters was found. The whole procedure is accordingly over.

In step S304, the clock obtaining module 202 obtains current time from the clock module 26 and transmits the current time to the search module 202.

In step S305, the search module 202 determines whether any matched TV program is on or about to start. If no, the procedure proceeds to step S306. If yes, the procedure proceeds to step S307.

In step S306, the search module 202 generates a program list showing information on the matched TV programs and displays the program list on the display module 27 via the multimedia player module 22 for a preset time interval. Upon the expiration of the preset time interval, the whole procedure is accordingly over.

In step S307, the search module 202 generates a program list showing information on the "currently on" or "about to start" TV programs among the matched TV programs and displays the program list on the display module 27 via the multimedia player module 22. In other exemplary embodiment, the program list can show information on all the matched TV programs.

In step S308, the user selection input determining module 204 determines whether a user selection input is received within a preset time interval. If no user selection input is received within a preset time interval, the procedure proceeds to step S309, otherwise the procedure proceeds to step S310. The user selection input is generated through operating the switch button 14 or the preview button 15.

In step S309, the search module 202 stops the display of the program list on the display module 27, and the whole procedure is over.

In step S310, the user selection input determining module 204 determines whether a preview selection input is received or a mode switching selection input is received. If a preview selection input is received, the procedure proceeds to step S311, otherwise the procedure proceeds to step S312. If a "currently on" TV program on the program list is selected and the preview button 15 is operated, the user selection input determining module 204 determines a preview selection input is received. If a "currently on" or "about to start" TV program on the program list is selected and the switch button 14 is operated, the user selection input determining module 204 determines a mode switching selection input is received.

In step S311, the TV program previewing module 205 provides the TV station of the selected TV program to the channel controlling module 207, thereby the channel controlling module 207 controls the TV tuning module 21 to tune in to the TV station within a preset time interval. The TV program previewing module 205 controls the multimedia player module 22 to output the selected TV program on the display module 27. The time interval preset for receiving a user selection input is greater than the time interval preset for previewing a selected TV program, thus preventing the procedure from going to step S309 during previewing of the selected TV program. After the previewing, the procedure goes to step S308 described above.

In step S312, the mode switching module 206 switches the DPF 10 from the DPF mode to the TV mode.

In step S313, the mode switching module 206 provides the TV station of the selected TV program to the channel controlling module 207, thereby the channel controlling module 207 controls the TV tuning module 21 to tune in to the TV station, and the whole procedure is over.

Although the present disclosure has been specifically described on the basis of preferred embodiments and method thereof, the disclosure is not to be construed as being limited thereto. Various changes or modifications may be made to the embodiments without departing from the scope and spirit of the disclosure.

What is claimed is:

1. A digital photo frame (DPF) with television (TV) tuning function comprising a DPF mode and a TV mode, comprising:
a TV tuning module configured for receiving TV signals;
a storage configured for storing at least a TV program schedule showing information on at least one TV program, the information comprising the program title, a broadcast time and the TV station of each of the TV programs;
a clock module configured for providing current time information;
a processor comprising:
a search parameter receiving module configured for receiving search parameters input by users under the DPF mode;
a clock obtaining module configured for obtaining current time from the clock module;
a search module configured for searching TV programs matching the search parameters in the TV program schedule, determining whether any matched TV program is on or about to start, and controlling the display of a program list showing information at least on "currently on" or "about to start" TV programs on a display module of the DPF if one or more matched TV program is on or about to start;
a user selection input determining module configured for determining whether any user selection input is received within a preset time interval when the program list is displayed, and further determining whether the user selection input is a mode switching selection input, wherein if a "currently on" or "about to start" TV program is selected and a switch button is operated, the user selection input determining module determines a mode switching selection input is received;
a mode switching module configured for switching the DPF from the DPF mode to the TV mode and providing the TV station information of the selected TV program to a channel controlling module if a mode switching selection input is received by the user selection input determining module; and
the channel controlling module configured for controlling the TV tuning module to tune in to the TV station of the selected TV program.

2. The DPF as described in claim 1, wherein the broadcast time comprises a start time and an end time of each of the TV programs.

3. The DPF as described in claim 1, wherein the broadcast time comprises a start time and a program time length of each of the TV programs.

4. The DPF as described in claim 1, wherein the broadcast time comprises a start time of each of the TV programs, the storage is further configured for storing at least one preset time interval, and the search module is configured for determining whether any matched TV program is on or about to start according to the start time of each of the TV programs and the preset time interval.

5. The DPF as described in claim 1, wherein the broadcast time comprises a start time of each of the TV programs, and the search module is further configured for listing the matched TV programs on the program list according to the start time of each of the TV programs.

6. The DPF as described in claim 1, wherein the search module is further configured for listing the matched TV programs on the program list according to preference.

7. The DPF as described in claim 1, wherein the search module is further configured for distinguishing the "currently on" TV programs from the "about to start" TV programs, and listing the "currently on" TV programs before the "about to start" TV programs on the program list.

8. The DPF as described in claim 1, wherein the search module is further configured for generating a notification signal if no matched TV program is found, and controlling the output of the notification signal within a preset time interval to notify users no TV program matching the search parameters is found.

9. The DPF as described in claim 1, further comprising a previous button and a next button configured for users to select a "currently on" or "about to start" TV program on the program list.

10. The DPF as described in claim 1, further comprising a preview button and a TV program previewing module, wherein if a "currently on" TV program on the program list is selected and the preview button is operated, the user selection input determining module determines a preview selection input is received, and the TV program previewing module is configured for controlling preview of the selected TV program if a preview selection input is received by the user selection input determining module.

11. The DPF as described in claim 10, wherein the preview of the selected TV program comprises providing the TV station informations of the TV programs to the channel controlling module, controlling the preview time and the preview location of the TV programs on the display module.

12. The DPF as described in claim 1, wherein the search module is further configured for stopping the display of the program list on the display module if no user selection input is received by the user selection input determining module within a preset time interval.

13. A method of a digital photo frame (DPF) with television (TV) tuning function comprising a DPF mode and a TV mode, the method comprising:
   receiving search parameters input by users under the DPF mode;
   searching in a pre-stored TV program schedule to find whether any TV program matches the search parameters, wherein the TV program information showed on the TV program schedule comprises the program title, a broadcast time and the TV station of each of the TV programs;
   obtaining current time;
   determining whether any matched TV program is on or about to start according to the TV program information and the current time;
   generating and displaying a program list showing information at least on the matched "currently on" or "about to start" TV programs if one or more matched TV programs are on or about to start;
   determining whether any user selection input is received;
   determining whether the user selection input is a mode switching selection input if a user selection is received, wherein if a "currently on" or "about to start" TV program on the program list is selected to play, a mode switching selection input is received by the DPF;
   switching the DPF from the DPF mode to a TV mode of the DPF when a mode switching selection input is received; and
   receiving and playing the selected "currently on" or "about to start" TV program.

14. The method as described in claim 13, further comprising:
   outputting a notification signal to notify users that no matched TV program is found if no TV program matches the received search parameters.

15. The method as described in claim 13, wherein the broadcast time comprises a start time and an end time of each of the TV programs.

16. The method as described in claim 13, wherein the broadcast time comprises a start time and a program time length of each of the TV programs.

17. The method as described in claim 13, wherein the broadcast time comprises a start time of each of the TV programs, and the matched TV programs on the program list are listed pursuant to their start times.

18. The method as described in claim 13, wherein the matched TV programs on the program list are listed according to preference.

19. The method as described in claim 13, wherein the "currently on" TV programs are distinguished from the "about to start" TV programs, and the "currently on" TV programs are listed before the "about to start" TV programs on the program list.

20. The method as described in claim 13, further comprising:
   determining whether a preview selection input is received, wherein a preview selection input is received by the DPF if a "currently on" TV program on the program list is selected to preview; and
   previewing the selected "currently on" TV program within a preset time interval if a preview selection input is received.

* * * * *